Jan. 15, 1935.   H. L. HAMILTON   1,987,619
AUTOMATIC LUBRICATOR
Original Filed March 12, 1921   3 Sheets-Sheet 1

WITNESSES

INVENTOR
H. L. HAMILTON
BY
ATTORNEYS

Jan. 15, 1935.  H. L. HAMILTON  1,987,619
AUTOMATIC LUBRICATOR
Original Filed March 12, 1921   3 Sheets-Sheet 2

WITNESSES

INVENTOR
H. L. HAMILTON
BY
ATTORNEYS

Jan. 15, 1935.   H. L. HAMILTON   1,987,619

AUTOMATIC LUBRICATOR

Original Filed March 12, 1921   3 Sheets-Sheet 3

WITNESSES

INVENTOR
H. L. Hamilton
BY
ATTORNEYS

Patented Jan. 15, 1935

1,987,619

UNITED STATES PATENT OFFICE 1,987,619

AUTOMATIC LUBRICATOR

Harold Louis Hamilton, Denver, Colo., assignor, by mesne assignments, to Auto Research Corporation, a corporation of Delaware Application March 12, 1921, Serial No. 451,910
Renewed March 11, 1932

84 Claims. (Cl. 184—7)

My invention relates to a means to automatically deliver a lubricant to various parts required to be lubricated in a machine and more particularly is designed for lubricating various elements in the chassis of a motor driven vehicle and to be driven from any convenient movable part appurtenant to the chassis.

An object of the invention is to provide means whereby a lubricant will be discharged in measured quantities through the medium of graduating feed means, and directed to the several parts to be lubricated in quantities and at intervals suiting the requirements of particular parts.

A further object of the invention is to provide a driven distributing valve coacting with the graduating means to supply the same, said valve and graduating means functioning by coordinated operations to intermittently deliver the oil in predetermined quantities to the parts to be lubricated.

A further important object of the invention is to provide a rotary distributing valve driven from a rotary part of the chassis without backgearing to an impractical extent but permitting nevertheless of controlling the periodicity of the distributing operations whereby to bring about the desired infrequency of lubricant feed.

A further important object of the invention also is to provide a lubricating apparatus whereby intermittent operations will alternately feed to the distributing and controlling means an ample supply of lubricant and alternately withdraw the lubricant from the distributing and controlling means with the result of preventing congealing of the lubricant in the passages and maintaining the passages clear and at maximum capacity at all times.

The invention furthermore has for an object to provide an intermittently acting graduating feed valve actuated by the oil supplied thereto under pressure and arranged to automatically restore its parts after an operation by the received oil.

More specifically the invention has for an object to provide lubricating means of the type referred to reflecting practical considerations with respect to convenience of installation, adjustment and control and making for the maximum efficiency in effecting the lubrication of the parts without discharging to the parts a surplus of lubricant.

Reference is to be had to the accompanying drawings forming a part of this specification, it being understood that the drawings are merely illustrative of one example of the invention.

Figure 1:
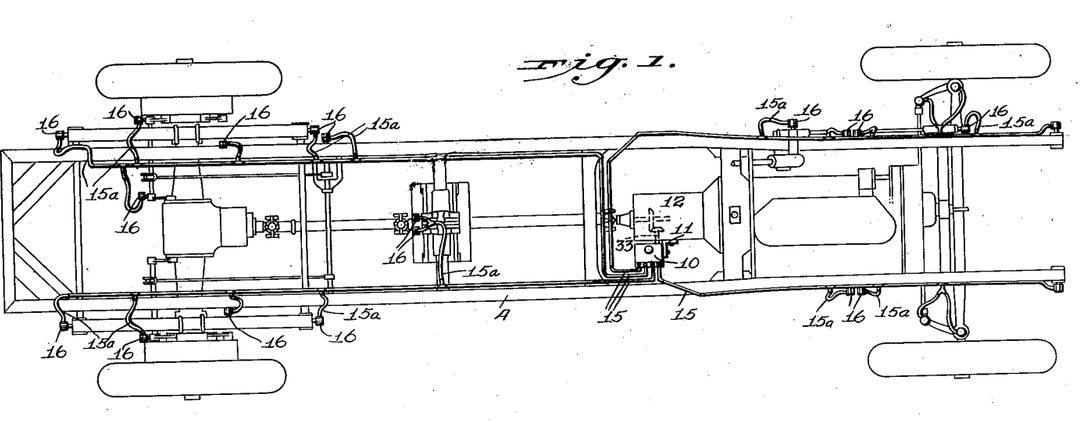
Figure 1 is a diagrammatic plan view of a chassis equipped with my improved lubricating means.

In carrying out my invention in practice in the illustrated form a reservoir designated generally by the numeral 10 is provided and suitably mounted on the chassis to be driven by a rotary element thereon, there being shown in Figure 1 a supporting bracket 11 secured to the case of the transmission designated generally by the numeral 12. The reservoir 10 has a hot-air jacket 10a having an inlet 10b which may be connected with any hot-air supply, and an outlet 10c. Said reservoir 10 as well as the distributing valve and graduating valve hereinafter described are in practice usually made of aluminum.

The oil from the reservoir is caused to pass through a distributing valve designated generally by the numeral 13 mounted in said reservoir and having suitable members such as threaded nipples 14 for distributing pipes 15.

The system of distributing pipes 15 with their necessary branches 15a lead to graduating valves 16 associated with the various parts to be lubricated and functioning to pass measured quantities of the lubricant to said parts. The respective measuring valves 16 have each an inlet here shown as in the form of a threaded nipple 17 to which the pipes 15 or branches 15a thereof lead from the nipples 14.

The reservoir 10 has a receiving compartment 18 for the lubricant into which the oil is supplied through a filling plug 19 having vents 20. From the receiving compartment 18 the oil is pumped to a pressure compartment 21 preferably and advantageously through the medium of a gear pump designated generally by the numeral 22 and comprising a pair of gears 23, 24, the oil being carried in the interdental spaces of the gear 24 from the compartment 18 to the compartment 21. In practice a return by-pass 21a leads from the pressure compartment 21, back to the receiving compartment 18, and is controlled by a check valve 21b.

The distributing valve 13 is arranged longitudinally in the pressure compartment 21 at the opposite side of the reservoir 10 from the compartment 18 and is composed of a plurality of hollow cylinders 25, 26, 27, one turning within the other, the outermost cylinder 25 turning in the casing or body 28 of the distributing valve. A series of tubes extend transversely across the hollow inner cylinder 27 and they are angularly disposed to be brought in succession into register with transverse ports 30 in the next outermost cylinder 26, said cylinders 26 in turn being adapted to be brought successively into register with transverse ports 31 in the outermost cylinder 25, said ports 31 in turn being adapted to successively be brought into register with the longitudinal series of inlet holes 32 in the valve casing 28 for the entrance of oil to the graduating valve from the pressure compartment or chamber 21. The ports 30 are in pairs, the ports of a pair being diametrically opposite and this is true also of the ports 31. The respective series of ports 30 and 31 and the transverse tubes 29 are spirally disposed in the respective cylinders and the latter are driven at differential speeds as hereinafter described so that the pipes 29 will in succession be brought into register with given ports 30, 31 and inlets 32. The arrangement is such that a discharge through a given outlet 14 may be caused at pronounced infrequency notwithstanding a comparatively high speed of revolution of the cylindrical valve elements.

Figure 2:
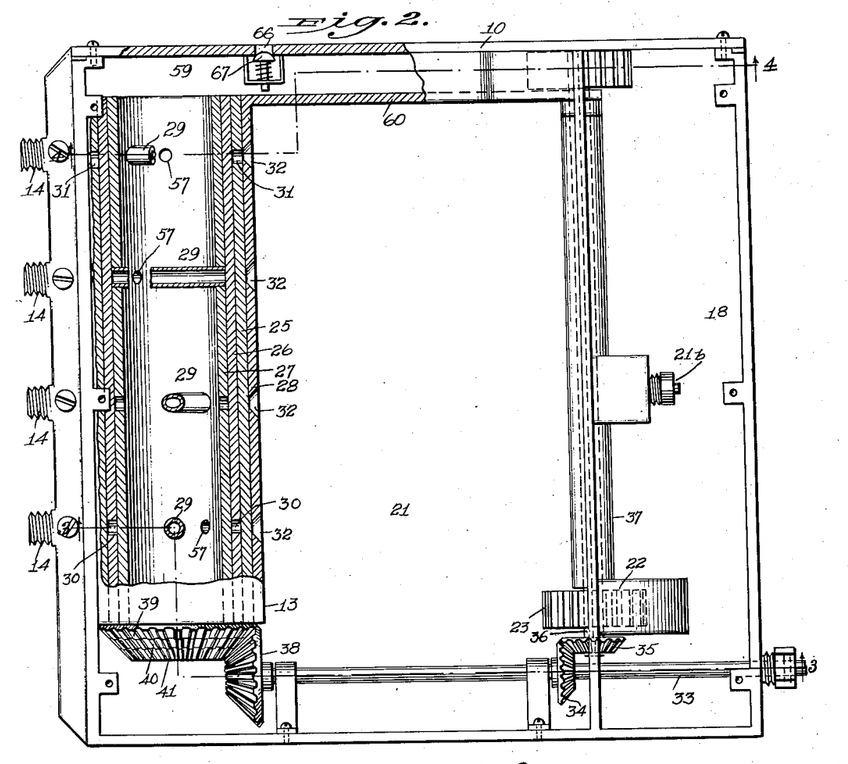
Figure 2 is a plan view of the reservoir and its appurtenances including the pressure pump and distributing valve the cover of the reservoir being removed and parts being in section.
Figure 3:
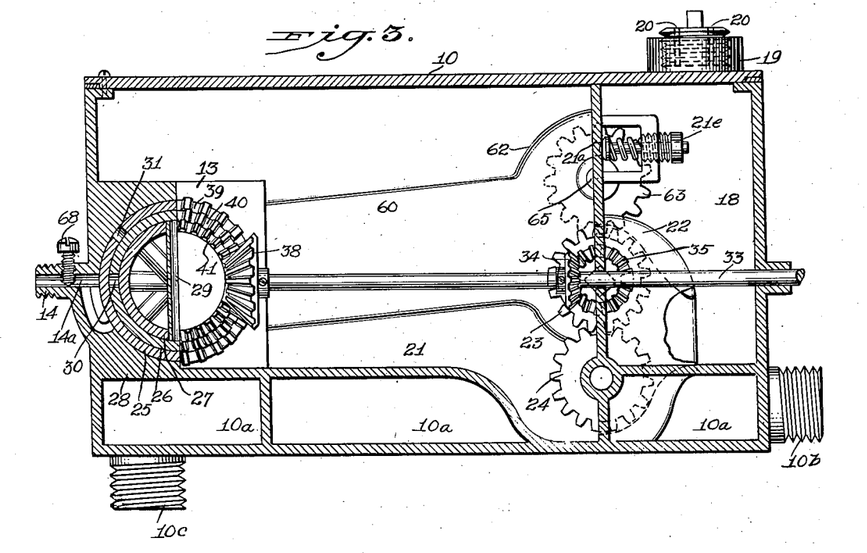
Figure 3 is a vertical section on the irregular line 3—3 of Figure 2.
Figure 4:
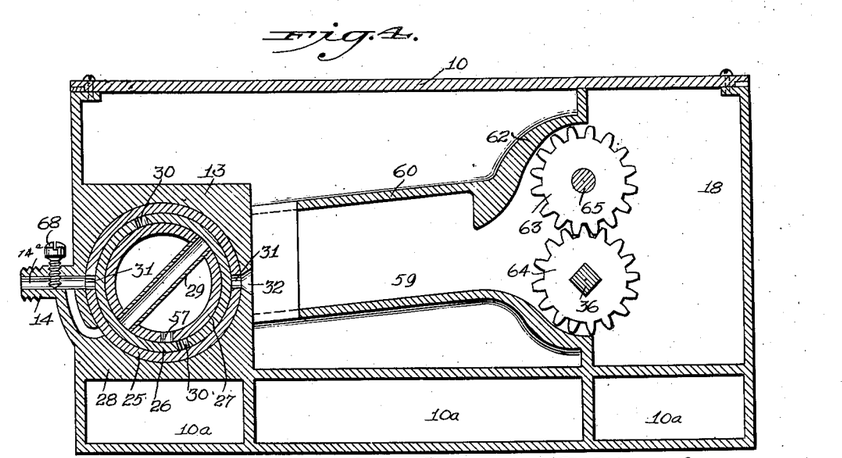
Figure 4 is a vertical section on the irregular line 4—4, Figure 2.
Figure 5:
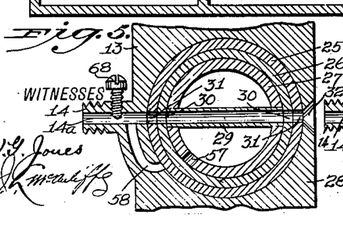
Figure 5 is a detail in cross section taken through the distributing valve with the cylindric valve elements in positions with ports and passages in alinement for a discharge of lubricant transversely through the valve.

The drive means for the rotary distributing elements of valve 13 and the pressure pump 22 consist in the illustrated example of a shaft 33 having driving connection for example with an element of the transmission mechanism. Said shaft has a bevelled pinion 34 meshing with a similar pinion 35 on a shaft 36 carrying the pump gear 23. The shaft 36 may be suitably housed between the compartments 18 and 21 as indicated at 37, Figure 2. On the shaft 33 also is a bevelled pinion 38 and this is adapted to mesh with bevelled ring gears 39, 40 and 41 of the respective cylindrical elements 25, 26, 27 of distributing valve 13. Said valve 13 is closed at the end having the ring gears 39, 40, 41 and is open at the opposite end.

The ring gears 39, 40, 41 are of a pitch varying one from another and when driven by the pinion 38 they will therefore be caused to revolve at slightly different speeds only permitting the passages and ports 29, 30, and 31 to come into register with the inlet 32 and the discharge nipples 14 once in a given number of revolutions predetermined by the gear ratio. The arrangement taken in connection with the spiral arrangement of the passages and ports 29, 30, 31, makes possible the maximum speed reduction so that in practice it is simply a matter of timing the drive of the elements 25, 26 and 27 to cause the registering discharge of the passages and ports once in say 2500 revolutions of the drive shaft 33.

Figure 9:
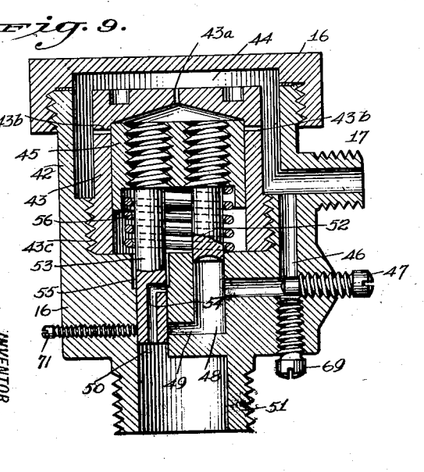
Figure 9 is a longitudinal section of the graduating valve for passing the lubricant in predetermined quantities to the parts to be lubricated.

The graduating valve 16, as shown in Figure 9, includes a body or casing 42 into which the inlet 17 leads. In said casing at the top is a cylinder 43 spaced from the casing wall 42 to form an oil chamber 44 above and at the sides of said cylinder. The cylinder is shown as screwed into the body of the valve as at 43c. A port 43a leads from the chamber 44 through the top of the cylinder to the interior thereof above or in front of a piston 45 operating in said cylinder and a port or ports 43b lead laterally from the chamber 44 into the interior of the cylinder and have in practice a capacity greater than the port 43a. The oil from the inlet 17 in addition to flowing into the chamber 44 to the front of the piston passes also in the opposite direction through an L-shaped port 46 controlled by a regulating valve 47 and leading to a cavity 48 below or at the back of the piston 45. From cavity 48 leads a lateral port 49 to a longitudinal bore 50 leading to the outlet nipple 51 to thus discharge to the point or element to be lubricated. In the cavity 48 operates a plug 52 on the back or underside of the piston 45 while a similar plug 53 on the piston at the underside and parallel with the first plug operates in the bore 50.

A spring 56 coiled about the plugs 52, 53 normally tends to raise the piston 45 to a position at the top of the cylinder and closing the lateral ports 43b. The plug 53 has an L-shaped oil passage 54 adapted to come into register temporarily with the port 49 in the downward movement of the piston 45. Said passage 54 in the uppermost position of the piston is in communication with a counter-bore 55 at the top of the bore 50 to constitute a drain and suction passage as hereinafter referred to.

Figure 6:
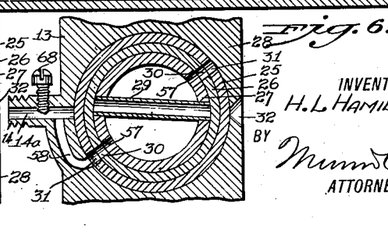
Figure 6 is a view similar to Figure 5 but with the discharge ports and passages out of alinement for the discharge of lubricant and in position permitting the withdrawal by suction of the lubricant from the distributing and feed regulating means.
Figure 7:
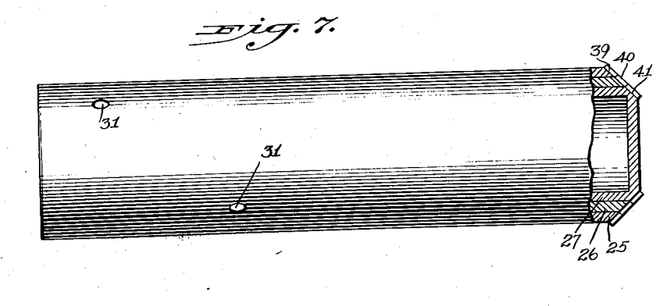
Figure 7 is a partly sectional side elevation of the revoluble cylindrical elements of the distributing valve.
Figure 8:
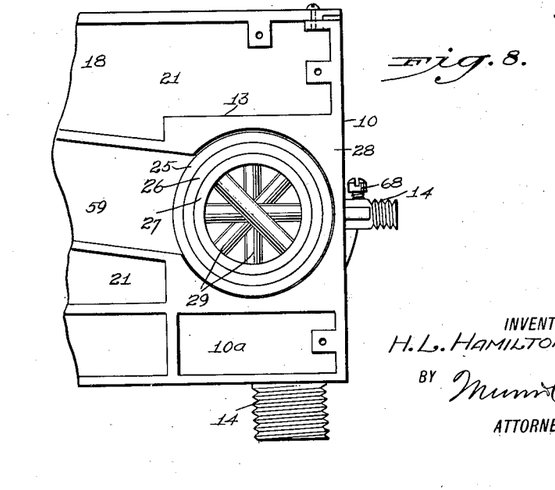
Figure 8 is a partial end view of the reservoir showing an end view of the distributing valve.

In operation, it being understood that the nipple 17, Figure 9, is connected by a pipe 15 and branch 15a with discharge nipple 14 from the distributing valve, oil will enter the chamber 44 and pass through the port 43a to the interior of the cylinder 43 above the piston 45 and since the oil is under the pressure in the chamber 21, the piston 45 will be slowly moved downwardly against the tension of the spring 56 and the resistance of the oil in the cavity 48, until the port or ports 43b are uncovered, thereby subjecting the front or top of the piston to the full pressure of the oil in the chamber 44. As the piston moves downwardly the plug 52 will finally cut off the L-shaped passage 46 and before the plug 53 closes the port 49 leading to the bore 50 and discharge outlet 51 so that the small quantity of oil remaining in the cavity 48 will be forced through the port 49 through said outlet. The continued downward movement of the piston 45 will cause the plug 53 to cut off the passage 49 from said outlet. The operation described will leave filled with oil the pipes 15, 15a leading to valve 16 as well as the chamber 44 and ports 46, 49, etc. and to prevent this oil from becoming cold and congealed I provide suction means to exhaust the oil and return it to the chamber 18 as follows: The inner cylindrical element 27 of the distributing valve 13, has ports 57 spirally disposed and said ports are adapted periodically to be brought into register with ports 30 and 31 as shown in Figure 6 and at the same time bring a port 57 into register with one of the ports or passages 58 in the valve casing or body 28, said ports or passages 58 communicating with the axial passages 14a of discharge nipples 14 and thus communication will be established between the interior of the distributing valve 13 and the inlet 17 and interior chamber 44 of a graduating valve 16.

To produce a vacuum in the interior of the valve 13 the open end of said valve communicates with a chamber 59 at a side of the reservoir 10 and separated from the pressure compartment 21 by a wall 60. In said chamber 59 is a suitable vacuum pump, preferably a gear pump designated generally by the numeral 62 and including as operative parts intermeshing pump gears 63, 64, the operation of which produces a vacuum in chamber 59, valve 13, pipes 15, 15a, and valve 16, thereby withdrawing the oil from the valve 16 with which communication has been established as well as from the connecting pipe 15, 15a, the oil being returned through the hollow interior of the valve 13 and the chamber 59 and pump 62, to the receiving compartment 18 of the reservoir 10.

The vacuum pump gear 64 is mounted on the shaft 36 while the intermeshing gear 63 is mounted on a shaft 65. Leading into the chamber 59 from the exterior is a vent opening 66 controlled by an inwardly opening check valve 67 to prevent too high a vacuum in the chamber 59. The numeral 68 indicates a regulating screw in each nipple 14 which screw may be employed as a shut-off, if it is desired to cut out a particular part of the distributing system.

The graduating valve 16, it will be observed, is optionally variable through the medium of the regualting screw 47 to pass predetermined quantities of oil to the cavity 49 and thence to the outlet 51 to suit the lubricating requirements of given parts. The screw 69 of valve 16 is removable for draining and affording a clean-out opening at the bottom.

The screw 71, Figure 9, is provided for making possible the thorough cleaning of the graduating valve 16 by removing said screw and the screws 47 and 69. Said screw 71 serves also to close the hole drilled through the valve body in forming the passage 49.

I would state in conclusion that while the illustrated example constitutes a practical embodiment of the invention, I do not limit myself strictly to the mechanical details herein illustrated, since manifestly the same can be considerably varied without departure from the spirit of the invention as defined in the appended claims.

The present application is broadly directed to a lubricating system, and also is specifically directed to a lubricating system having a return from the piping to the reservoir. The present application is further directed to the measuring valve or flow controlling units positioned at the outlets of said system and proportioning the flow of lubricant to the various bearings.

According to the present invention, the lubricant distributing system is so refined not only to handle ordinary liquid lubricants but also to handle lubricants which will tend to congeal with low atmospheric temperatures. With such congealable lubricants which will not flow readily at all atmospheric temperatures to which an automobile chassis may be subjected, it is desirable to heat the lubricant in the reservoir and/or to cause return of a large part or substantially all the lubricant from the distributing piping system.

It is obvious, of course, that the application may be used for other purposes than for lubricating automotive bearings, particularly automobile chassis bearings, and/or with other types of lubricant than the congealable lubricant specifically described.

The lubricating system shown, described and claimed, also may be used without the return to the reservoir and the measuring units may be used without the adjustment 47. The valves 52 and 53 and adjustment 47 may be constructed in other manners than shown, and/or may be used independently of one or more other elements specifically shown in combination with them. One feed line may be utilized to feed the bearings instead of a plurality, as shown.

Having thus described my invention, I claim:

1. In a lubricator of the class described, a reservoir, a driven distributing valve having means to permit a discharge of oil therethrough at intervals, means to supply oil under pressure from said reservoir to said distributing valve, a series of valves in communication with said distributing valve to receive oil under pressure therefrom and adapted to discharge the oil in a predetermined measured quantity, and means to produce at intervals a vacuum in said distributing and delivery valves and withdraw the oil from said series of valves through the distributing valve to the reservoir.

2. In a lubricator of the class described, a reservoir, a driven distributing valve having means to permit a discharge of oil therethrough at intervals, means to supply oil under pressure from said reservoir to said distributing valve, and a series of valves in communication with said distributing valve for all the valves of said series to receive oil under the same pressure from the distributing valve and adapted to discharge the oil in predetermined measured quantities, the several valves being separately adjustable independently of the distributing valve to variously discharge the oil.

3. A lubricator of the class described having a receiving compartment for a lubricant and a pressure compartment, a pump to transfer oil from the first compartment to the second compartment under pressure, a driven distributing valve in communication with the pressure compartment and having a plurality of discharge outlets, and means to variously direct the lubricant from the several outlets; together with means to intermittently produce a vacuum in the distributing valve and delivery means to cause the oil in said delivery means to return through the distributing valve to the said first compartment of the reservoir.

4. A lubricator including a distributing valve, means to deliver oil thereto under pressure, means to variously deliver the oil from said distributing valve, and a pump acting on the delivery means to forcibly withdraw from said delivery means that oil remaining after a delivery impulse.

5. In a lubricator, means to supply oil under pressure, means to direct the same to the part to be lubricated, and a pump acting to forcibly withdraw from the second means undistributed oil remaining therein.

6. In a lubricator of the class described, oil delivery means, means to supply oil thereto, means to cause forced withdrawal from the delivery means of the undistributed oil therein, and means to cause the delivery means and the oil withdrawing means to function alternately.

7. In a lubricator of the class described, feed means for the lubricant, means to forcibly withdraw from the feed means unfed lubricant remaining therein, and means coordinating the operations respectively of said means to cause said lubricant withdrawing means to function alternately with each action of the feed means.

8. In a lubricator of the class described, a distributing valve, and means to supply oil under pressure thereto, said valve having inlet means and outlet means, and including a plurality of differentially driven elements each formed with ports variously disposed therein to register in succession with one another and with said inlet means and outlet means for the escape of oil through the valve at intervals.

9. In a lubricator of the class described, a distributing valve, and means to supply oil under pressure thereto, said valve having inlet means and outlet means, and including a plurality of differentially driven elements formed with ports variously disposed to bring into register in succession the ports of the respective elements with one another and with said inlet means and outlet means for the escape of oil through the valve at intervals; together with means to pass measured quantities of oil at intervals from said valve to the parts to be lubricated, and means to intermittently establish communication between said oil-passing means and the outlet means of the distributing valve.

10. In a lubricator of the class described, an oil distributing valve having inlet means and a plurality of discharge outlets and comprising a plurality of differentially driven cylindrical elements one within the other and each formed with variously disposed oil ports for the passage of oil therethrough, said ports being adapted to be brought into register with one another and with the inlets and outlets at intervals by the turning of said elements.

11. In a lubricator of the class described, a distributing valve comprising a plurality of elements having ports variously positioned for the passage of oil therethrough when the respective ports are in register, and means to differentially drive said elements.

12. In a lubricator of the class described, a driven distributing valve adapted to intermittently discharge oil and affording passages for the return of oil, a plurality of graduating feed valves, means to selectively establish communication between particular feed valves and the distributing valve, a vacuum pump to withdraw oil from the feed valves, and means to intermittently establish through the medium of the return passages of the distributing valve and in connection therewith, communication between the vacuum pump and said feed valves.

13. In a lubricator of the class described, oil delivery means, a distributing valve discharging to said delivery means to direct oil thereto and adapted to receive a supply of oil, said distributing valve comprising a plurality of hollow cylindrical elements one within another, and means to differentially drive said elements, the inner cylindrical element having variously disposed therein means to pass oil transversely therethrough and the other elements having spirally disposed transverse feed ports arranged in pairs, the ports of a pair being diametrically opposite, and adapted by the differential turning of the elements to be periodically brought in succession into register with given transverse passages of the inner element.

14. In a lubricator of the class described, oil delivery means, feed valves in said oil delivery means adapted to pass predetermined measured quantities of oil, a distributing valve discharging to said delivery means to direct a supply of oil thereto, said distributing valve comprising a plurality of hollow cylindrical elements one within another, and means to differentially drive said elements, the inner cylinder element having variously disposed therein means to pass oil transversely therethrough and having variously disposed transverse ports for the return of oil and the other elements having each a spiral series of transverse feed ports arranged in pairs, the ports of a pair being diametrically opposite and adapted by the differential turning of the elements to be periodically brought in succession into register with given transverse passages of the inner element, there being a return passage in the valve body in communication with the feed and delivery means, said return ports of the inner cylindrical elements being adapted to periodically register with the feed ports of the other elements and with said return passage of the body, and means to produce a suction in the inner element to withdraw oil therethrough from the delivery means and feed valves.

15. In a lubricator of the class described, a distributing valve comprising a casing having inlet means for oil, a plurality of cylindrical elements disposed in the casing one within another, the innermost element having transverse passages disposed in a spiral series and the other elements having pairs of transverse ports approximately diametrically opposite, the pairs of ports being spirally disposed in the respective elements, and means to differentially drive said elements to bring said transverse ports into register periodically with given transverse passages of the inner element.

16. In a lubricator of the class described, a distributing valve comprising a plurality of cylindrical elements one within the other, ring gears on said elements, the respective ring gears varying in pitch one from another, and a driven gear element meshing with the respective ring gears, the inner cylindrical element having transverse oil passages spirally disposed and the other cylindrical elements having transversely disposed spiral series of transverse ports arranged in pairs, certain ports of one cylindrical element being adapted to vertically register with certain ports of another cylindrical element and with given transverse passages of the inner cylindrical element by the differential turning of said elements.

17. In a lubricator of the class described, a feed valve, a reservoir, means to establish a feed passage between said reservoir and said feed valve, means to establish a return passage from said feed valve to said reservoir, a pressure pump in the first-mentioned means, a vacuum pump in the second-mentioned means, and means to alternately actuate said pumps to cause oil to be alternately fed under pressure to and withdrawn from the feed passage and feed valve, said feed valve having a cylinder, a piston operating therein, an oil chamber outside of said cylinder and adapted to receive oil from the first-mentioned passage, a spring tending to restore the piston after an operation by the oil pressure, there being communication between said cylinder and said chamber at the front of the piston to cause the piston to be actuated by the pressure of the oil in said chamber, there being a cavity in said valve at the back of the piston and in communication with said oil chamber, a plunger on the piston at the back movable to and from said cavity to eject oil therefrom and return, there being a passage leading from said cavity to the valve outlet, and a second plunger on the piston at the back to normally cut off the cavity from the valve outlet and having a passage serving to establish communication between the valve outlet and the passage from said cavity momentarily during a stroke of the piston to the second-mentioned plunger, said cavity and said oil chamber being subject to the suction produced in the valve by said vacuum pump when in operation.

18. In a lubricator of the class described, a feed valve, a reservoir, means to establish a feed passage between said reservoir and said feed valve, means to establish a return passage from said feed valve to said reservoir, a pressure pump in the first-mentioned means, a vacuum pump in the second-mentioned means, and means to alternately actuate said pumps to cause oil to be alternately fed under pressure to and withdrawn from the feed passage and feed valve.

19. A lubricator of the class described including a reservoir having a receiving compartment, and a pressure compartment, a pump to transfer oil from the receiving compartment and direct it under pressure to the pressure compartment, oil feed means, oil controlling means to direct the oil from the pressure compartment to said feed means, a vacuum pump discharging to said receiving compartment, and means to bring the feed means and controlling means into communication alternately with said pressure chamber and with said vacuum pump.

20. A lubricating means including means to intimately supply oil under pressure by feed impulses, means to direct the oil from the said supply means to the parts to be lubricated, and means connected with said second means and adapted to withdraw therefrom by suction the oil remaining therein after each feed impulse to the parts to be lubricated.

21. A lubricating means including means to supply oil under pressure, means to direct the oil from said supply means to parts to be lubricated, and means connected with said second means and adapted to remove therefrom by suction, oil remaining therein after lubricant feed has ceased.

22. In a lubricating installation, in combination, bearings, oil discharge units associated therewith and delivering measured charges thereto, means transmitting through lubricant extending from a remote source to said units, pressure to substantially all of the volume that is traversed by oil during operation, between the inlet and the outlet of the unit, each of said units including a measuring chamber, a member having a portion subjected to pressure from the source for displacement thereby and including plugging means of reduced diameter unitary therewith, urged thereby to seal a flow passage in said unit, in order to prevent emission to the bearing of more than the measured charge, a return stop for the end of said member opposed to the plugging means, a spring coiled about a part of said member and urging it against said stop, each of said units including a cavity charged with oil during the application of pressure from the source and delivering substantially the measured quantity therefrom into said chamber through a port entirely between the ends of the side wall of the chamber.

23. The combination of a plurality of bearings, a lubricant reservoir, a pump supplying lubricant pressure associated therewith, a distributing pipe leading from the pump, measuring devices with inlets and with outlets connected to bearings, branch pipes connecting the inlets to the distributing pipe, reciprocable means in each of the devices for discharging lubricant to the bearings, said means being operated by the lubricant pressure, and means associated with and at the pump causing a reverse flow of lubricant from said devices toward said reservoir after discharge of said reciprocable means.

24. The combination of a plurality of bearings, an oil reservoir, a pressure pump, an oil pressure supply pipe leading from the reservoir, measuring valves connected between the supply pipe and bearings, said valves each consisting of two communicating cylinders with inlets and outlets, reciprocating devices working in each cylinder controlling the discharge of the oil to the bearings operated by oil pressure from said pipe, resilient means resisting movement of said reciprocating devices by said oil pressure and normally positioning the devices at the inlet ends of the cylinders, and means associated with said pump for causing flow towards said pump from said valves after cessation of said pressure application.

25. A lubricating system for machine bearings comprising a lubricant reservoir, connections including a conduit from the reservoir to a bearing to be lubricated, pumping means for intermittently producing pressures on the lubricant in the conduit and for causing forward and reverse flow, means permitting passage of lubricant from said connections into said reservoir, and a measuring valve adjacent said bearing for controlling the quantity of lubricant supplied thereto.

26. A lubricating system for machine bearings comprising a lubricant reservoir, a plurality of bearings to be lubricated, connections between said reservoir and said bearings, mechanism for intermittently applying lubricant pressure in said connections, means for causing a reverse flow of lubricant from said connections toward said reservoir, a plurality of measuring valves adjacent said bearings and adapted to be operated upon successive applications of the lubricant pressure in said connections and valve means at said mechanism to control said reverse flow.

27. A lubricating installation for a plurality of bearings comprising a reservoir, lubricant pumping means, a piping system having an inlet at said pumping means, said pumping means causing forward flow in said system away from said reservoir and also causing reverse flow in said system toward said reservoir, and a plurality of outlets to the bearings to be lubricated and valve devices located at said inlet and at each of said outlets, the devices at said outlets supplying measured quantities of lubricant to said bearings and the device at said inlet serving to control the flow to and from said reservoir.

28. In a motor vehicle, in combination, a chassis having a plurality of bearings, a power actuated source of lubricant and of intermittent pressure, piping leading therefrom, terminal conduits supplied from said piping and leading to the bearings, and a measuring unit in each of said terminal conduits, each of said units having a chamber therein charged from said source, and a reciprocating valve member in said chamber subjected to pressure from the source to move the valve member, said movement of said valve member establishing communication between the chamber and the bearing after the chamber has been charged under pressure, said unit being provided with means to eject lubricant from said chamber under pressure toward the corresponding bearing, and a spring returning said valve to normally interrupt communication between the piping and the bearing.

29. In a motor vehicle, in combination, a chassis having a plurality of bearings, an automatically actuated source of lubricant and of intermittent pressure operated only upon operation of the vehicle, piping leading therefrom, terminal conduits supplied from said piping and leading to the bearings and a flow control unit near one end of each of said terminal conduits, each of said units having a chamber therein and a reciprocating valve control element in each of said units subjected to pressure from said source, shutting off communication to the bearing from said chamber to permit charge of said chamber under pressure from said source and opening while said chamber is under pressure for pressure ejection of lubricant from the chamber toward the bearing, and a spring returning said valve to normally interrupt communication between the piping and the bearing after the flow of lubricant from the source has been cut off.

30. In a motor vehicle, in combination, a chassis having a plurality of bearings, a machine-driven source of lubricant and of intermittent pressure, piping leading therefrom, terminal conduits supplied from said piping and leading to the bearings, and a flow control device near one end of each of said terminal conduits, each of said devices having a chamber therein with an exit and having also a reciprocating valve therein blocking the exit from said chamber during charging of the latter under pressure from the source, and opening the exit to the bearing after the chamber has been filled with lubricant under pressure, said valve being moved through its operative stroke by pressure from the source, and having a spring associated therewith to effect return stroke thereof after the flow of lubricant from the source has been cut off.

31. In a motor vehicle, in combination, a chassis having a plurality of bearings, a motor driven source of lubricant and of intermittent pressure, piping leading therefrom, terminal conduits supplied from said piping and leading to the bearings and a flow control device near one end of each of said terminal conduits, each of said devices having a chamber therein and having also a reciprocating plunger valve unit therein blocking exit from said chamber during charging of the latter under pressure from the source, said valve unit opening the exit from and closing the inlet to said chamber while the latter is still under pressure, in order to effect pressure ejection of lubricant therefrom toward the bearing, said valve moved through its operating stroke by pressure from the source and having a spring associated therewith tending to return said unit to initial position.

32. In a motor vehicle, in combination, a plurality of chassis bearings, a source of lubricant and of intermittent pressure, a plurality of distributors in lubricant communicating relation with said source, each of said distributors serving to divide lubricant from the source among the bearings at a corresponding portion of the vehicle, terminal conduits leading from the distributors to the various bearings supplied therefrom, each of said conduits having at one end thereof a flow controlling plunger valve propelled in one direction by pressure transmitted from the source, and means to effect automatically after each operation thereof a rapid diminution of pressure throughout the system between the source and the valve, said valve having a return spring associated therewith, whereby upon termination of each pressure operation, it is promptly restored to normal position.

33. In a motor vehicle, in combination, a chassis having a plurality of bearings, a source of lubricant and of intermittent pressure, piping leading therefrom, terminal conduits supplied from said piping and leading to the bearings and a flow control device near one end of each of said terminal conduits, each of said devices having a chamber therein with inlet and outlet ports and having a reciprocating valve plunger unit associated therewith controlling both the inlet and outlet ports of said chamber, said unit moved by pressure from said source and having a spring coiled about a part thereof to restore the same to initial position, the leakage past said devices serving to effect after each discharge operation thereof a decrease of pressure throughout the piping system between the source and the flow control devices in order to enable spring return of the plunger units.

34. In a lubricating system for motor vehicles, in combination, a source of pressure, a bearing, a conduit, a flow controlling device supplied from said conduit and delivering to said bearing, said device having a measuring chamber therein normally devoid of lubricant, and including a plunger propelled under pressure transmitted from said source and having a spring encircling the same to restore it to normal position after flow from the source has been cut off, said plunger in the course of its movement permitting admission of lubricant under pressure from the source into the chamber, shutting off the chamber from communication with the source and opening communication from the chamber to the bearing for ejection of lubricant therefrom under pressure resulting from energy derived from the source of pressure.

35. In a lubricating installation, in combination, a source of lubricant and of intermittent pressure, a bearing, a conduit leading from said source to said bearing, a flow control unit supplied by said conduit and delivering to the bearing, said unit including a cylindrical measuring chamber with a port in the side thereof, and elongated metallic plunger means for controlling the charge and discharge of said chamber through said port, said plunger means subjected to pressure from the source and having a spring coiled thereabout serving to restore the same to normal position after pressure from the source has been cut off, said plunger means permitting direct communication from the source to the chamber to fill the latter under pressure from the source and while said chamber is under pressure successively in the course of the plunger means travel shutting off communication from the source to the chamber and opening communication for pressure ejection from the chamber to the bearing.

36. In a lubricating installation, in combination, a source of lubricant and of intermittent pressure, a bearing, a conduit leading from said source to said bearing, a flow control unit supplied by said conduit and delivering to the bearing, said unit including a cylindrical measuring chamber therein with inlet and outlet ports in the sides thereof and elongated metallic plunger means for controlling the charge and discharge of said chamber, said plunger means having an enlarged head subjected to pressure from the source, a spring coiled thereabout at a part thereof beyond said head and serving to restore said plunger means to normal position after pressure from the source has been cut off, said plunger means permitting direct communication from the source to the chamber to fill the latter under pressure from the source, the plunger having cylindrical valve parts of reduced diameter adapted to plug the inlet and outlet ports in the sides of said cylindrical chamber, said plunger means while said chamber is under pressure being displaced during the travel to shut off the inlet to the chamber and open the outlet from said chamber for pressure ejection of lubricant therefrom.

37. A lubricating system comprising a lubricant reservoir, connections including a conduit from the reservoir to a bearing to be lubricated, mechanism for intermittently producing and cutting off pressure on the lubricant in the conduit and a valve mechanism in said conduit comprising a valve body having an inlet and an outlet port, a reciprocating valve unit controlling the flow through said ports, a spring arranged to hold the unit at one end of its course encircling a part of said unit, said unit and the contiguous parts of said valve body being arranged to provide an increase in the effective pressure upon the corresponding end of the valve unit, immediately after commencement of the stroke thereof.

38. A lubricating system, comprising a conduit connecting a source of lubricant supply with a bearing, means for applying and cutting off pressure intermittently on the lubricant in said conduit, an inlet and an outlet valve in said conduit, yielding means including a coil spring encircling said valves to hold one of said valves closed and the other open during the period of low lubricant-pressure and to permit the closed valve to be opened and the open valve closed by an increase of pressure on the lubricant, a restricted conduit for admitting fluid pressure to actuate said valve and means for diminishing said restriction after the commencement of the movement thereof against the yielding means.

39. In a lubricating installation, in combination, bearings, oil discharge units associated therewith and delivering measured charges thereto, means transmitting through lubricant extending from a remote source to said units, pressure to substantially all of the volume that is traversed by oil during operation, between the inlet and the outlet of the unit, each of said units including a measuring chamber, a member having a portion subjected to pressure from the source for displacement thereby and including plugging means of reduced diameter unitary therewith, urged thereby to seal a flow passage in said unit, in order to prevent emission to the bearing of more than the measured charge, a return stop for the end of said member opposed to the plugging means, a spring coiled about a part of said member and urging it against said stop, each of said units including a cavity charged with oil during the application of pressure from the source and delivering substantially the measured quantity therefrom into said chamber through a port entirely between the ends of the side wall of the chamber.

40. A central lubricating installation for an automobile chassis comprising a system of piping on the chassis having outlets leading to various bearings thereof, a source of lubricant carried on the vehicle, a control valve at the inlet to the piping system serving to shut off the supply thereto of lubricant from said source and means driven from a part of the automobile transmission mechanism for determining the opening of said valve at intervals corresponding to a definite distance run of the vehicle.

41. A central lubricating installation for an automobile chassis comprising a system of piping on the vehicle having outlets leading to various bearings, a source of lubricant carried on the vehicle and a central control valve mechanism determining automatically the intermittent flow of lubricant toward the bearings, said mechanism having a driving coupling with a part of the automobile transmission mechanism in advance of the propeller shaft.

42. A central lubricating installation for an automobile chassis comprising a system of piping on the vehicle having outlets leading to various bearings, a source of lubricant carried on the vehicle and maintained under pressure while the automobile is operating, a control valve normally closed to shut off the flow of lubricant from the source toward the bearings, and mechanism coupled to the automobile transmission, continuously driven thereby and correlated with said valve to effect opening thereof at intervals corresponding to predetermined distance runs of the vehicle.

43. A central lubricating installation for an automobile chassis comprising a system of piping on the chassis having outlets leading to various bearings, a source of lubricant carried on the chassis and maintained under pressure while the automobile is operating, a control valve determining the flow of lubricant from the source toward the bearings, and means coupled to the automobile transmission mechanism and constructed and arranged to open the control valve after a predetermined distance run of the vehicle and thereafter to close the valve after a relatively shorter distance run of the vehicle.

44. A lubricating installation for an automobile chassis comprising a source of lubricant, piping leading therefrom to various chassis bearings, a central control valve structure normally interrupting communication from said source to said piping, flow control means in the branches of the piping leading to the bearings, and operating mechanism for said valve structure, coupled to the transmission mechanism of the automobile, to intermittently establish communication through the valve structure to the piping.

45. In a motor vehicle of the type including an engine, a change speed box and a propeller shaft, an installation for automatically lubricating various bearings of the chassis at predetermined intervals of mileage travelled, said installation including a source of lubricant, means operated from the engine for applying pressure to the lubricant at said source, a piping system for conveying lubricant from the source to the various chassis bearings, a control valve mechanism to intermittently establish communication from said source to the piping system, said mechanism having a fixed operating connection coupled to the drive shaft in the change-speed box.

46. In a motor vehicle of the type including an engine and transmission mechanism to the driving wheels, said mechanism including a change-speed box; the combination therewith of a source of oil, an engine driven oil pump, a pipe system leading from a central locality on the vehicle to the various chassis bearings, control valve means normally blocking the admission to said pipe system of lubricant propelled by said pump, and speed reduction mechanism coupled to the drive shaft in the change-speed box and serving to open the control valve means at predetermined intervals of mileage run.

47. In a motor vehicle of the type including an engine, a transmission driven therefrom and connected to the driving wheels, said transmission including a change-speed box, a source of oil, a pump driven from the engine for applying pressure to the oil, a control unit near the transmission box, a piping system leading from said unit to various chassis bearings, said unit including a valve normally shutting off said pipe system from communication with said pump, said unit including speed reducing valve operating gearing coupled to the drive shaft in the change-speed box.

48. In a motor vehicle of the type including an engine, a transmission driven therefrom and connected to the driving wheels, said transmission including a change-speed box, a source of lubricant, a piping system supplied from said source and leading to various chassis bearings, a control unit carried by said transmission box including rotary valve means normally closed to shut off communication from said source to said pipe line, a gear on the drive shaft of the transmission box, said control unit having reduction gearing including an element meshing with said gear, and serving to turn said rotary valve means in one direction, for intermittently opening and closing the same.

49. An automatic distance control unit for a central automobile chassis lubricating installation, said unit including a case adapted for mounting upon the transmission box of an automobile and having a protruding shaft adapted to extend into said transmission box to mesh with a gear on the driven shaft in the latter, a rotary valve enclosed in said case and speed reducing mechanism in said case drivingly interposed between the shaft and the valve.

50. A central lubricating installation for an automobile chassis comprising a system of piping on the chassis having outlets leading to various bearings thereof, a source of lubricant carried on the chassis, a pump operated from the engine and maintaining said lubricant under pressure, a control valve at the inlet to the piping system normally closed to prevent supply of lubricant from the source to the pipe line, measuring valve units at the outlets of the piping, means driven from the transmission of the automobile for intermittently opening said control valve to transmit lubricant under pressure from the pump through the piping system to the various measuring valves for causing the latter to emit measured charges, and means to automatically return said measuring valves to normal position after each operation thereof.

51. A central lubricating installation for an automobile chassis, comprising a system of piping on the vehicle having outlets leading to various bearings, a source of lubricant carried on the vehicle, and a central control valve mechanism determining the intermittent flow of lubricant toward the bearings, said mechanism including multiple step reduction gearing having a driving coupling connection to a part of the automobile transmission mechanism in advance of the propeller shaft.

52. An automatic control valve mechanism for a chassis lubricating system, said mechanism comprising a casing having an outlet port therein, a driving gear protruding therefrom and adapted to be coupled to a gear on an automobile transmission, a cylindrical structure in said casing, reduction gearing drivingly connecting said driving gear to said cylindrical structure, said cylindrical structure having a transverse valve port therethrough, the casing port extending in the path of movement of the valve port.

53. In a motor vehicle, in combination, a chassis having a plurality of bearings, a source of lubricant and of intermittent pressure, piping leading therefrom, terminal conduits supplied from said piping and leading to the bearings, and a measuring unit in each of said terminal conduits, each of said units having a chamber therein, and a reciprocating valve member in said chamber subjected to pressure from the source, and opening communication to the bearing while the charged chamber is under pressure whereby lubricant will be ejected from said chamber under pressure toward the corresponding bearing, and a spring returning said valve to normally interrupt communication between the piping and the bearing, said source including means for applying successively a pressure greater and less than atmospheric pressure to the piping for approximately equal time intervals.

54. A central lubricating installation for a mechanism having a plurality of spaced bearings comprising a central reservoir, a central pump supplied from said reservoir, a trunk and branch conduit system having associated with the outlet branches at the bearings a series of metering devices, each device including a casing having an inlet and an outlet, a piston structure in said casing including a part of larger diameter at which piston-propulsive pressure is applied and a part of smaller diameter connected for expulsion of lubricant from the casing, means positioning said piston structure at one extreme of its stroke, said device, being provided with inlet flow passage means through which lubricant pressure is applied to said part of larger diameter, and means to render said inlet flow passage means of increased effectiveness in flow area toward the part of larger diameter for increased effectiveness of pressure communication to the piston after slight movement of the piston away from said extreme of its stroke.

55. In a central lubricating system, the combination of a plurality of bearings to be lubricated, an intermittently operable lubricant pressure supply, a branched conduit system connected to said supply, and a lubricant flow control fitting associated with each of said bearings and connected to said conduit system, said fitting comprising a cylindrical bore, a plug of slightly smaller diameter than said bore and longitudinally movable therein in one direction upon application of lubricant pressure, resilient means for moving said plug in the opposite direction, and an adjustable restriction to control the flow through said fitting.

56. A central lubricating installation for a mechanism having a plurality of spaced bearings comprising a piping system with a plurality of outlets to the bearings, each including a measuring valve device, a central source of lubricant and lubricant pressure, and automatically actuated means for intermittently actuating said source to move lubricant through said piping system in one direction and subsequently in a reverse direction, each said measuring valve including means to feed measured quantities of lubricant into said bearings actuated upon forward movement of said lubricant.

57. In a motor vehicle having a lubricating pump and a chassis having bearings provided with lubricator openings, the combination of lubricators mounted respectively in said openings, each of said lubricators being provided with a bore registering with the opening in the bearing, a supply line for conducting lubricant under pressure from the pump to a series of said lubricators, adjustable means associated with each lubricator for regulating the flow of lubricant through the individual lubricators to their respective bearings, and automatically operable means for controlling the supply of lubricant to the entire series of lubricators.

58. A lubricating system comprising a plurality of bearings to be lubricated, a source of lubricant remote from said bearings, a conduit for conveying lubricant from said source to said bearings, said conduit comprising a branch conduit leading to each bearing, a fitting interposed between each branch conduit and the corresponding bearing, each of said fittings having a bore communicating with the corresponding branch conduit, an adjustable plug extending into said bore and forming a restricted passageway for resisting the flow of lubricant through the fitting, a reciprocating valve member in said fitting, a return spring in said fitting for said member and actuating means located near said source of lubricant for supplying lubricant under pressure to said fittings.

59. A lubricating installation comprising, in combination, a branched piping system having outlets to a plurality of bearings, a central reservoir, a central pump intermittently feeding under pressure from said reservoir into said system, each outlet including a charge determining device located adjacent to a bearing, said device having a cylinder with an inlet port, a piston therein, a chamber between the cylinder and the bearing, having a relatively smaller cross-sectional area than the area of said piston and also having an inlet port and an outlet port, an imperforate plunger operable in said chamber for forcing lubricant therefrom through the outlet port to the bearing, said plunger being operated by said piston, a valve controlling the outlet port of said chamber preventing flow of lubricant from said chamber except when it is forced therefrom by said plunger, an inlet passage leading to the inlet port of said chamber, another passage separated from said inlet passage to supply pressure to the inlet port of said cylinder to operate said piston and thereby said plunger and means to return said piston and plunger after said operation of the plunger.

60. In a lubricating system for machine bearings, a branched conduit, means for increasing and decreasing pressure on the lubricant in said conduit and measuring valves in said conduit, each comprising a valve body having a chamber therein, an inlet port and an outlet port communicating with said chamber, piston-valve means in said body and in said chamber reciprocating to force lubricant from said chamber through said outlet port when the pressure is being increased, said piston-valve means being actuated to discharge lubricant with each increase of pressure on the lubricant in the conduit, and a spring arranged to return said piston-valve means when the lubricant flow has been cut off, said piston-valve means including a main piston, a reciprocating valve positioned adjacent the inlet port and another reciprocating valve positioned adjacent the outlet port.

61. A lubricating system for machine bearings, comprising a source of lubricant supply including a pump, a conduit connecting said source of lubricant supply with a bearing, said source supplying lubricant under pressure intermittently into said conduit incidental to said pump discharge, means for causing reverse lubricant flow automatically actuated subsequent to said pump discharge, an inlet and an outlet valve in said conduit, and coil spring means to return said inlet and outlet valve after said pump discharge.

62. A lubricating system comprising a main pump, a main distribution system connected thereto, secondary pumps adjacent the outlets of said main system actuated by the main pump, each of said secondary pumps including a pressure responsive actuating device including a pressure chamber and a piston therein and a pump structure including a cylinder and piston therein, said cylinder having an inlet through its side and said piston cutting off said inlet during its discharge stroke, said pressure chamber and said inlet being supplied with lubricant under pressure from said system, said first piston having a substantially larger diameter than said second piston, and said first piston being connected to said second piston to actuate the same.

63. A central lubricating system for the chassis bearings of an automobile comprising an oil reservoir, an engine driven pump adapted to draw oil from said reservoir, a pressure chamber adapted to receive oil from said pump, an engine driven outlet valve for said pressure chamber, a branched conduit system adapted to intermittently receive oil under pressure from the outlet valve and convey it to points near the chassis bearings, measuring devices in the conduit at each bearing including a valve adapted to be moved against spring pressure by the lubricant to cut off the flow of lubricant through said devices after a predetermined quantity has been delivered, and to be held in closed position during the maintenance of pressure in the branched conduit, and means for causing reverse flow from said devices toward said pump.

64. A lubricating system for machine bearings, comprising a lubricant reservoir, connections including a conduit, from the reservoir to a bearing to be lubricated, mechanism for intermittently producing and reversing pressure on the lubricant in the conduit, and means located between said mechanism and the bearing to regulate the quantity of lubricant delivered to the bearing for each produced application of pressure to the lubricant in the conduit.

65. A lubricating system for machine bearings, comprising a lubricant reservoir, a conduit having branches, each connected to a bearing to be lubricated, mechanism for intermittently producing pressure in the conduit and simultaneously supplying a quantity of lubricant thereto, and subsequently removing a quantity of lubricant therefrom, and means located in each branch and operated by the pressure of the lubricant, to regulate the quantity of lubricant delivered from each branch to its bearing on each application of pressure.

66. A lubricating system for machine bearings, comprising a conduit leading from a reservoir to a bearing, means to supply lubricant under pressure to the conduit at the reservoir and means automatically to remove lubricant from the conduit successively at the bearing end and at the reservoir end, said means including a separate mechanism to measure and deliver intermittently a quantity of lubricant from the conduit to the bearing upon pressure supply of lubricant.

67. A lubricating system comprising a plurality of bearings to be lubricated, a pump for supplying lubricant to said bearings having a discharge conduit comprising a plurality of branch conduits, one of which extends to each of said bearings, and means connecting the outer end of each branch conduit with the corresponding bearing, and actuated by the pressure of the lubricant in said discharge conduit, for intermittently supplying a measured quantity of lubricant to said bearing and means for reversing lubricant flow in said conduits.

68. The combination with a plurality of bearings to be lubricated, of a conduit having a plurality of branch conduits, one of which leads to each of said bearings, a source of lubricant under continuous pressure, means for intermittently connecting said source with said conduit, means in each of said branch conduits, actuated by the intermittent pressure impressed upon the lubricant in said conduit for supplying a quantity of lubricant to the bearing with which said conduit is connected and means for passing lubricant back to said source after each intermittent pressure application, said last mentioned means preventing said reverse flow during the period of the pressure application.

69. A lubricating system comprising a bearing to be lubricated, a lubricant supply reservoir remote therefrom, a lubricant connection therebetween, a lubricant feed control device local to the bearing including pressure and measuring compartments, conduits from said connection simultaneously to feed said compartments, and means at said reservoir to remove lubricant simultaneously from said compartments.

70. A central lubricating system including a plurality of charge-determining lubricant cups having pistons operated in one direction by lubricant pressure and in the other direction by a spring, a lubricant reservoir-pump arrangement, a pipe system connecting said reservoir-pump arrangement with said cups, and two-way valve means for normally maintaining said system disconnected from said pump but intermittently permitting said pump to force lubricant through said system and subsequently to permit lubricant flow from said system into said reservoir-pump arrangement, said last mentioned means preventing said reverse flow during the period of the pressure application.

71. A lubricating system comprising a plurality of bearings to be lubricated, a pump and reservoir for supplying lubricant to said bearings having a discharge conduit comprising a plurality of branch conduits, one for each of said bearings, and measuring valve means connecting the outer end of each branch conduit with the corresponding bearing, and actuated by the pressure of the lubricant in said discharge conduit, for intermittently supplying a quantity of lubricant to said bearing and means actuated only after the bearings have been supplied with a quantity of lubricant to remove lubricant from said conduit to said reservoir.

72. The combination with a plurality of bearings to be lubricated, of a conduit having a plurality of branch conduits, one for each of said bearings, a source of lubricant under continuous pressure, means for intermittently connecting said source with said conduit, measuring valve means in each of said branch conduits, actuated by the intermittent pressure impressed upon the lubricant in said conduit for supplying a quantity of lubricant to the bearing with which said conduit is connected and mechanically actuated means having a direct actuating mechanical connection with said intermittently connecting means for passing lubricant back to said source after each intermittent pressure application.

73. In a central lubricating installation for a mechanism having a plurality of spaced bearings, a central lubricant reservoir having a casing, a pump receiving lubricant from said reservoir in said casing, a branched distributing system including a plurality of conduits, an inlet connection to the system from the pump through which the pump supplies lubricant pressure to said system and a plurality of outlets leading to the bearings, each outlet including a reciprocating piston measuring device for proportioning the lubricant thereto forced to one end of its stroke by said pressure and provided with a return spring, said pump and reservoir being incorporated in a unitary structure and said pump being positioned at one end of said reservoir casing and said casing being provided with an outlet valve and a return valve, said outlet valve serving to alternately establish communication between said pump and said system and cut off said pump from said system and said return valve being provided with means serving to remove lubricant from the system into the reservoir.

74. In a central lubricating installation for a mechanism having a plurality of spaced bearings, a central lubricant reservoir having a casing, a pump receiving lubricant from said reservoir in said casing, a branched distributing system including a plurality of conduits, an inlet connection to the system from the pump through which the pump supplies lubricant under pressure to said system and a plurality of outlets leading to the bearings, each outlet including a reciprocating piston measuring device for proportioning the lubricant thereto forced to one end of its stroke by said pressure and provided with a return spring, said pump and reservoir being incorporated in a unitary structure and said pump being positioned at one end of said reservoir casing and said casing being provided with an outlet valve and a return valve, said outlet valve serving to alternately establish communication between said pump and said system and cut off said pump from said system and said return valve being provided with means enabling removal of lubricant from the system into the reservoir, and means to render said return valve effective only after closure of said outlet valve.

75. In a central lubricating installation for a mechanism having a plurality of spaced bearings, a central lubricant reservoir having a casing, a pump receiving lubricant from said reservoir in said casing, a branched distributing system including a plurality of conduits, an inlet connection to the system from the pump through which the pump supplies lubricant pressure to said system and a plurality of outlets leading to the bearings, each outlet including a reciprocating piston measuring device for proportioning the lubricant thereto forced to one end of its stroke by said pressure and provided with a return spring, said pump and reservoir being incorporated in a unitary structure and said pump being positioned at one end of said reservoir casing and said casing being provided with an outlet valve and a return valve, said outlet valve serving to alternately establish communication between said pump and said system and cut off said pump from said system and said return valve being provided with means enabling removal of lubricant pressure from the system into the reservoir, said return valve being mechanically actuated to open the system into the reservoir after the pump has completed its discharge into the system.

76. A lubricating system for machine bearings, comprising a lubricant reservoir, a conduit having branches, each connected to a bearing to be lubricated, machine driven mechanism for intermittently producing pressure in the conduit and simultaneously supplying a quantity of lubricant thereto, and measuring valve means located in each branch accurately to apportion the quantity of lubricant delivered from each branch to its bearing in predetermined relative quantities dependent upon the requirements of the individual bearings, independently of the bearing resistances, said measuring valve means each including an open outlet to the bearing, a measuring chamber and a piston closely fitting therein to directly displace a measured volume of lubricant therefrom into the bearing through said outlet without retardation, said piston displacing the measured volume of lubricant with one face and being subjected to actuating lubricant pressure at another face opposite to said displacing face and said chamber being filled with lubricant before said displacing action of the piston.

77. A lubricating system for the bearings of a motor driven vehicle comprising a lubricant reservoir, a branched conduit system leading from said reservoir to the chassis bearings of said vehicle, measuring valve means to measure and deliver different quantities of lubricant to the individual bearings in accordance with their respective requirements, and intermittently operating mechanism controlled by said vehicle to admit lubricant flow from said reservoir to said measuring means, said measuring valve means each including an open outlet to the bearing, a measuring chamber and a piston closely fitting therein to directly displace a measured volume of lubricant therefrom into the bearing through said outlet without retardation, said piston displacing the measured volume of lubricant with one face and being subjected to actuating lubricant pressure at another face opposite to said displacing face and said chamber being filled with lubricant before said displacing action of the piston.

78. In a lubricating system for an automotive vehicle having motor mechanism for propelling the same, a lubricant reservoir, a branched conduit system leading to a plurality of bearings of said vehicle, measuring valve metering means in said conduit system associated respectively with the bearings to be lubricated to supply accurately measured charges of lubricant thereto, means for forcing lubricant from said reservoir to said conduit system, and means deriving its motivating power from the engine of said vehicle to render said last-named means ineffective, said measuring valve means each including an open outlet to the bearing, a measuring chamber and a piston closely fitting therein to directly displace a measured volume of lubricant therefrom into the bearing through said outlet without retardation, said piston displacing the measured volume of lubricant with one face and being subjected to actuating lubricant pressure at another face opposite to said displacing face and said chamber being filled with lubricant before said displacing action of the piston.

79. In an automobile having an engine, an oil reservoir, connections between the reservoir and a plurality of chassis bearings of the automobile, measuring valve metering means of metal in said connections to properly apportion oil among the several chassis bearings, and means driven from the engine to initiate the flow of oil through said connections and metering means to said bearings, said measuring valve means each including an open outlet to the bearing, a measuring chamber and a piston closely fitting therein to directly displace a measured volume of lubricant therefrom into the bearing through said outlet without retardation, said piston displacing the measured volume of lubricant with one face and being subjected to actuating lubricant pressure at another face opposite to said displacing face and said chamber being filled with lubricant before said displacing action of the piston.

80. In a centralized lubricating system for the lubrication of the chassis bearings of an automotive vehicle having a motor for propelling the same, the combination of an oil reservoir, a pump deriving its supply of oil from said reservoir and adapted to discharge oil under pressure, a branched conduit system supplied with oil by the discharge of said pump, lubricant measuring valve flow metering means positioned adjacent the ends of the branches of said conduit system for proportioning the discharge of said pump among a plurality of said chassis bearings in accordance with their predetermined requirements, and means controlled by the said engine of said vehicle for intermittently interrupting the discharge of oil into said conduit system by said pump, said measuring valve means each including an open outlet to the bearing, a measuring chamber and a piston closely fitting therein to directly displace a measured volume of lubricant therefrom into the bearing through said outlet without retardation, said piston displacing the measured volume of lubricant with one face and being subjected to actuating lubricant pressure at another face opposite to said displacing face and said chamber being filled with lubricant before said displacing action of the piston.

81. In an automobile having chassis bearings requiring lubrication and an engine, a centralized lubricating system comprising a pumping mechanism deriving power from said engine, a branched conduit system leading to a plurality of chassis bearings having predetermined diverse lubrication requirements, measuring valve metering means for apportioning the lubricant supplied by said pumping mechanism among said chassis bearings in predetermined amounts corresponding to their requirements, said pumping mechanism being operated to inject charges of oil into said conduit system intermittently, and valve mechanism in said metering means for preventing the draining of the lubricating system when the automobile is not in operation, said measuring valve means each including an open outlet to the bearing, a measuring chamber and a piston closely fitting therein to directly displace a measured volume of lubricant therefrom into the bearing through said oulet without retardation, said piston displacing the measured volume of lubricant with one face and being subjected to actuating lubricant pressure at another face opposite to said displacing face and said chamber being filled with lubricant before said displacing action of the piston.

82. In a mechanism, a centralized lubricating system comprising an oil reservoir, a power driven pump supplied therefrom, a branched conduit system connecting said pump with a plurality of bearings having different lubrication requirements, power operated control means coordinated with said pump to regulate the supply of lubricant to said conduit system, and measuring valve metering means in the branches of the conduit system to apportion the lubricant among the bearings according to their individual requirements, said measuring valve means each including an open outlet to the bearing, a measuring chamber and a piston closely fitting therein to directly displace a measured volume of lubricant therefrom into the bearing through said outlet without retardation, said piston displacing the measured volume of lubricant with one face and being subjected to actuating lubricant pressure at another face opposite to said displacing face and said chamber being filled with lubricant before said displacing action of the piston.

83. In a lubricating system, a pump having a casing, a member movable in said casing to discharge oil therefrom under pressure, a reservoir connected with said casing and forming the source of supply for said pump, a branched conduit system connecting said pump with a plurality of bearings having different lubrication requirements, power operated means coordinated with said pump to regulate the supply of oil to said conduit system, and measuring valve metering means of predetermined diverse ratings in the branches of said conduit system to apportion the lubricant supplied to the bearings according to their individual requirements, said measuring valve means each including an open outlet to the bearing, a measuring chamber and a piston closely fitting therein to directly displace a measured volume of lubricant therefrom into the bearing through said outlet without retardation, said piston displacing the measured volume of lubricant with one face and being subjected to actuating lubricant pressure at another face opposite to said displacing face and said chamber being filled with lubricant before said displacing action of the piston.

84. In a lubricating system of the type comprising a lubricant reservoir, connections including a conduit from the reservoir to a bearing to be lubricated, mechanism for intermittently producing and cutting off pressure on the lubricant in the conduit, a valve mechanism in said conduit comprising a valve body having an inlet and an outlet port, a reciprocating valve unit controlling the flow through said ports, a spring coiled about a portion of said unit and arranged to hold the unit at one end of its course, said unit and the contiguous parts of said valve body being arranged to provide an increase in the effective pressure upon the corresponding end of the valve unit, immediately after commencement of the stroke thereof.

HAROLD LOUIS HAMILTON.